United States Patent Office 3,512,999
Patented May 19, 1970

3,512,999
PROCESS FOR COLORING VARNISHES, LACQUERS, PRINTING INKS OR PLASTIC MATERIALS WITH PIGMENTS DERIVED FROM α,β-DIKETOBUTYRIC ACID DERIVATIVES
Peter Dimroth, Ludwigshafen, Rhineland, Germany, assignor to Badische Anilin- & Soda-Fabrik Aktiengesellshaft, Ludwigshafen (Rhine), Germany
No Drawing. Filed May 29, 1967, Ser. No. 642,228
Claims priority, application Germany, June 14, 1966,
B 87,545
Int. Cl. C09d 11/00, 11/02, 11/16
U.S. Cl. 106—20                                    4 Claims

ABSTRACT OF THE DISCLOSURE

Process for coloring varnishes, lacquers, printing inks or plastic materials with nickel complexes of butyric acid derivatives as pigments. These pigments exhibit very good fastness properties, especially light fastness.

---

This invention relates to a process for coloring varnishes, lacquers, printing inks or plastic materials with pigments derived from α,β-diketobutyric acid derivatives.

It is known that nickel dimethylglyoxime may be used as a red pigment because of its insolubility. On account of its low color strength and poor light fastness however it is little suited for practical use.

We have now found that the nickel complexes of dioximes of α,β-diketobutyroanilides having the general formula:

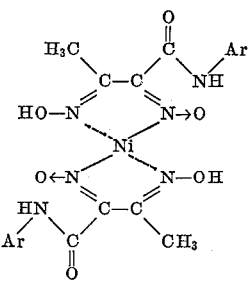

in which Ar denotes an aromatic radical which may bear substituents other than water-solubilizing groups are excellent pigments which are distinguished particularly by outstanding light fastness and that they are suitable for coloring varnishes, lacquers, printing inks or plastic materials.

The said compounds may be prepared by known methods, for example by reaction of dioximes of α,β-diketobutyroanilides with nickel salts in a liquid medium, as described in the Journal of the Indian Chemical Society 36 (1959), pages 302–304.

Substituents for the radical Ar may be for example halogen atoms, alkyl groups, alkoxy groups, nitro groups, acylamino groups, carbalkoxy groups, carboxylic amide groups, carbonanilide groups, sulfonamide groups or phenylazo groups, but not water-solubilizing substituents, such as sulfonic acid groups and carboxyl groups. The said carbon-containing radicals (with the exception of the phenylazo radical and the carbonanilide radical) should preferably not contain more than four carbon atoms.

Examples of specific substituents are: chlorine, bromine, methyl, ethyl, propyl, methoxy, ethoxy, acetylamino, carbomethoxy, carboethoxy, carbonamide, N,N-dimethylcarbonamide, carboxylic-meta-methoxyanilide or sulfonic-N-methylamide.

Ar preferably denotes an unsubstituted or substituted phenyl radical.

The pigments having the following general formula are particularly suitable for coloring:

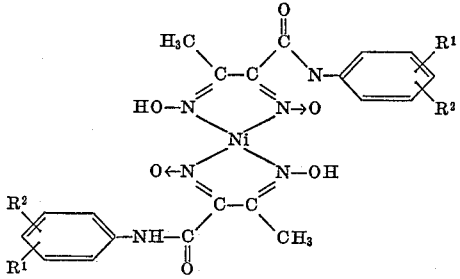

in which $R^1$ and $R^2$ each denotes a hydrogen atom or chlorine atom or a methyl, ethyl, methoxy, ethoxy, acetylamino or phenylazo group.

Examples of nickel salts which are suitable for the production of the complex compounds are nickel sulfate, nickel acetate and nickel chloride.

Advantageous solvents for the reaction of the dioximes of α,β-diketobutyroanilides with nickel salts are for example alcohols and other water-miscible organic liquids, and also mixtures of these compounds with water. Methanol, butanol, glycol monomethyl ether and dimethylformamide are particularly suitable.

The pigments are often obtained in a form in which they can be used immediately. They may however be brought into special forms for example by grinding with a salt, by swelling or by dispersion. Pigments to be used in accordance with this invention are suitable for example for coloring paper and particularly varnishes, lacquers, paints and plastics. Examples of plastics are polyvinyl chloride, polystyrene, polyamides and polyethylene.

The pigments are used in concentrations of about 20 to 50% for printing inks. Owing to their excellent light fastness they are particularly suitable for use in lacquers and varnishes, into which they are incorporated in amounts of up to about 5%. Smaller amounts of pigment are required for coloring plastics, for example 0.1 to 1%. Usually the pigment is mixed thoroughly with the plastics granules and the mixture is then extruded once or more than once. Polystyrene, polyvinyl chloride and polyethylene are particularly suitable for coloring in this way. In all other respects, the use of the nickel complex pigments is similar to that of other pigment dyes.

The invention is illustrated by the following examples in which parts and percentages are by weight.

EXAMPLE 1

221 parts of the dioxime of α,β-diketobutyroanilide is stirred in 3000 parts of methanol with a solution of 125 parts of nickel acetate tetrahydrate in 500 parts of water for five hours at 50° C. The product is suction filtered while hot, washed with methanol and dried. 230 parts of a yellow pigment powder is obtained.

EXAMPLES 2–14

Nickel complexes having the general formula:

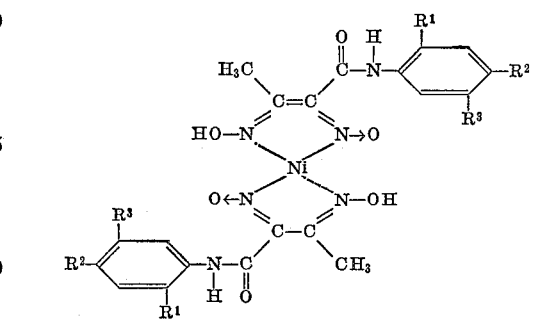

in which $R^1$, $R^2$ and $R^3$ denote the substituents indicated in the following Table are obtained by methods analogous to that of Example 1. The table also gives the color of the pigments:

| Example | $R^1$ | $R^2$ | $R^3$ | Color of pigment |
|---|---|---|---|---|
| 2 | H | CH₃ | H | Yellow. |
| 3 | Cl | H | H | Greenish yellow. |
| 4 | OCH₃ | H | H | Orange. |
| 5 | H | OCH₃ | H | Red. |
| 6 | H | H | OCH₃ | Reddish yellow. |
| 7 | Cl | Cl | H | Yellow. |
| 8 | H | H | CH₃ | Orange. |
| 9 | CH₃ | H | H | Yellow. |
| 10 | H | CH₃ | CH₃ | Do. |
| 11 | CH₃ | CH₃ | H | Do. |
| 12 | H | H | Cl | Do. |
| 13 | OCH₃ | H | OCH₃ | Red. |
| 14 | OC₂H₅ | Cl | OC₂H₅ | Do. |

The use of the pigments in baking finishes.—95 parts of a baking finish (consisting of 67 parts of coconut oil alkyd resin, 17 parts of a urea-formaldehyde resin and 16 parts of ethylene glycol) is ground in a cone mill with 8 parts of the pigment described in Example 1. The yellow lacquer thus obtained has excellent fasteness to light and overspraying, for example after having been baked on an aluminum sheet or foil.

Colorings having similar fastness are obtained by using the pigments prepared in Examples 2 to 14.

The use of the pigments in printing inks.—To prepare an intaglio printing ink, for example 10 parts of the pigment obtained in Example 1 is mixed in a ball mill with 90 parts of a colophony resin solution consisting of colophony resin dissolved in an equal amount of toluene. Prints prepared with this printing ink have very good light fastness.

Excellent light-fast prints are also obtained by using the pigments prepared in Examples 2 to 14.

The use of the pigments in plastics.—100 parts of polystyrene granulate and 0.08 part of the pigment obtained according to Example 1 are well mixed in a drum and extruded twice at 190° C. The granulate obtained is processed in an injection moulding machine.

Colored polyethylene may be prepared in the same way. The pigment in both materials has excellent light fastness. The same applies to the pigments according to Examples 2 to 14.

I claim:
1. A process for coloring varnishes, lacquers, printing inks or plastic materials which comprises admixing with the material to be colored a pigment of the formula

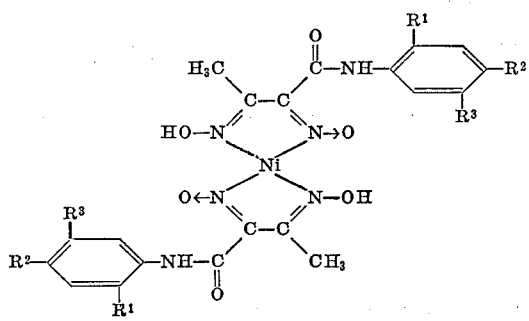

wherein $R^1$, $R^2$ and $R^3$ each represent a substituent selected from the class consisting of hydrogen, chlorine, methyl, ethyl, methoxy and ethoxy.

2. A process according to claim 1 which comprises using the compound of the formula

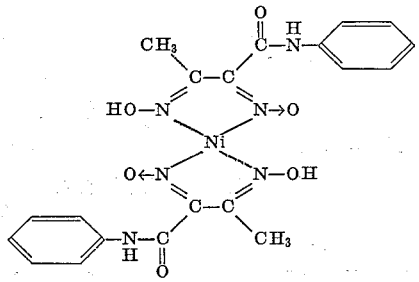

as pigment.

3. A process according to claim 1 which comprises using the compound of the formula

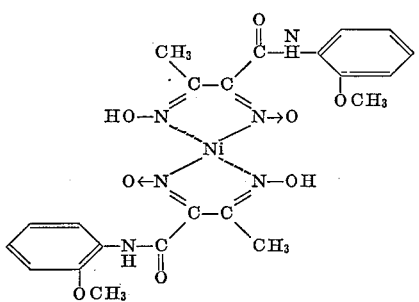

as pigment.

4. A process as claimed in claim 1 wherein the material being colored is polystyrene.

References Cited

UNITED STATES PATENTS

| | | | |
|---|---|---|---|
| 3,013,067 | 12/1961 | Dunn | 260—439 XR |
| 3,107,232 | 10/1963 | Matlack | 260—439 XR |
| 3,261,790 | 7/1966 | Hecker et al. | 260—45.75 XR |
| 3,367,959 | 2/1968 | Fetscher et al. | 260—439 XR |
| 2,909,542 | 10/1959 | Soloway | 260—439 XR |

JULIUS FROME, Primary Examiner

J. B. EVANS, Assistant Examiner

U.S. Cl. X.R.

106—22, 23, 308; 260—41, 41.5